United States Patent [19]

Perry

[11] Patent Number: 5,301,384
[45] Date of Patent: Apr. 12, 1994

[54] WINDSHIELD SCRUBBER AND BLADE WIPING ASSEMBLY

[76] Inventor: Joseph W. Perry, 1820 W. Roma Ave., Phoenix, Ariz. 85015

[21] Appl. No.: 769,859

[22] Filed: Oct. 2, 1991

[51] Int. Cl.$^5$ ............................................. B60S 1/38
[52] U.S. Cl. .................. 15/250.40; 15/250.41; 15/250.36; 15/250.33
[58] Field of Search .......... 15/250.40, 250.41, 250.11, 15/250.33, 250.23, 250.19, 250.35, 250.22, 250.21, 250.32, 250.15; 254/127, 386, 387; 74/89.2

[56] References Cited

U.S. PATENT DOCUMENTS

| | | | |
|---|---|---|---|
| 988,215 | 3/1911 | Shryock | 15/250.11 |
| 2,187,876 | 1/1940 | Ericson | 15/255 |
| 3,906,583 | 9/1975 | Murphy | 15/250.41 |
| 4,016,623 | 4/1977 | Nixdorf | 15/250.40 |
| 4,327,457 | 5/1982 | Lunsford | 15/250.41 |
| 4,649,593 | 3/1987 | Gilliam III et al. | 15/250.41 |
| 4,672,708 | 6/1987 | Williams | 15/250.003 |
| 4,719,661 | 1/1988 | Hanselmann | 15/250 |
| 4,958,405 | 9/1990 | Kühbauch | 15/250.23 |
| 5,048,146 | 9/1991 | Cavenago | 15/250.40 |
| 5,168,595 | 12/1992 | Naylor | 15/250.4 |

FOREIGN PATENT DOCUMENTS

| | | | |
|---|---|---|---|
| 2619633 | 11/1977 | Fed. Rep. of Germany . | |
| 3402808 | 6/1985 | Fed. Rep. of Germany ... | 15/250.21 |
| 2000224 | 8/1969 | France | 15/250.40 |
| 61-16341 | 5/1987 | Japan | 15/250.32 |

OTHER PUBLICATIONS

International Publications No. WO 80/0155.

Primary Examiner—Harvey C. Hornsby
Assistant Examiner—Gary K. Graham
Attorney, Agent, or Firm—Warren F. B. Lindsley

[57] ABSTRACT

A vehicular window cleaning apparatus having a wiper arm, wiper blade and drive means therefor in combination with a scrubber for intensifying the cleaning effort of the wiper blade. The scrubber is detachably connected to the wiper blade. An adjustment means is provided for rotating the wiper blade relative to the wiper arm for selectively and sequentially positioning the wiper blade and scrubber against an associated windshield.

4 Claims, 2 Drawing Sheets

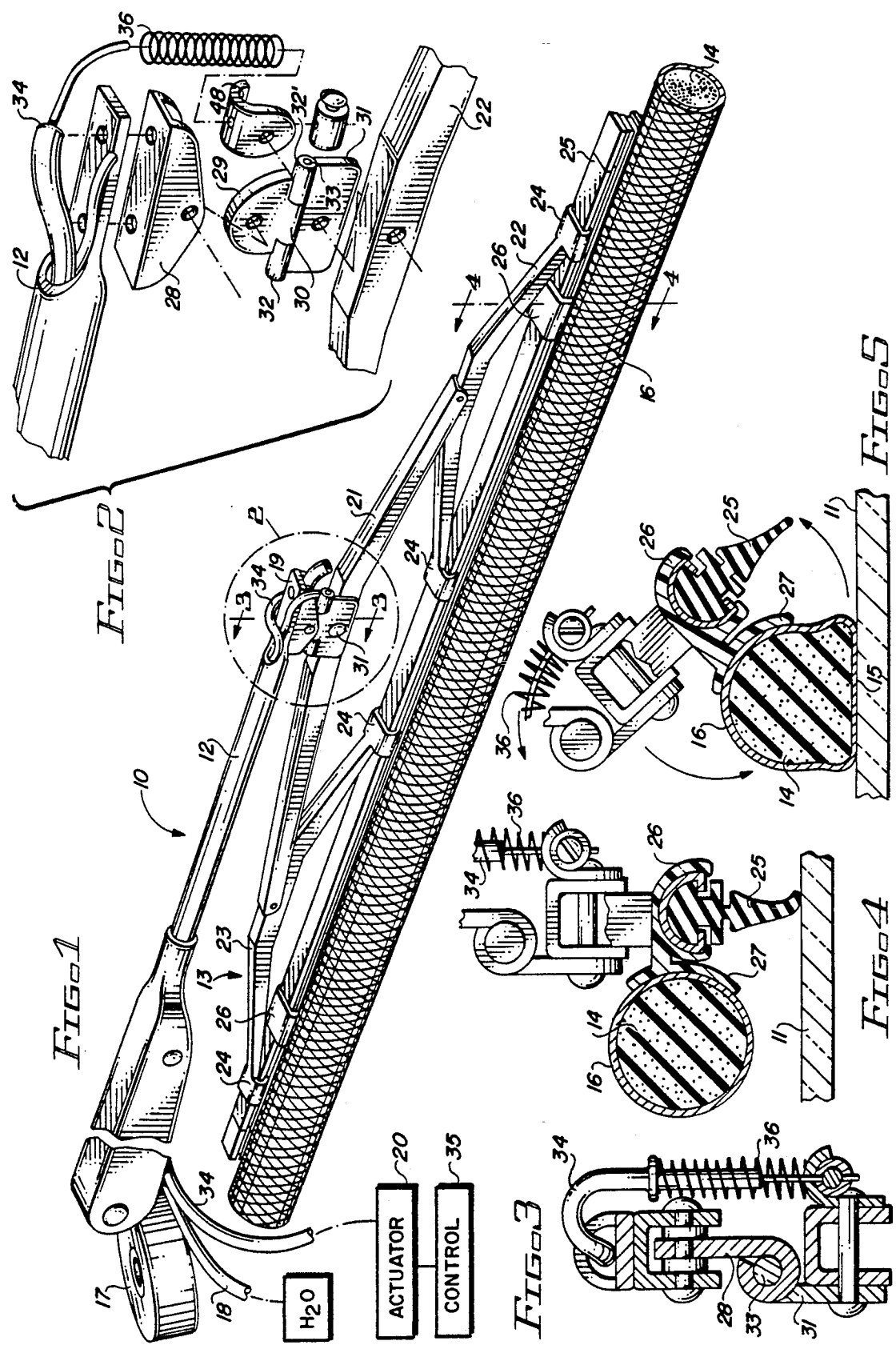

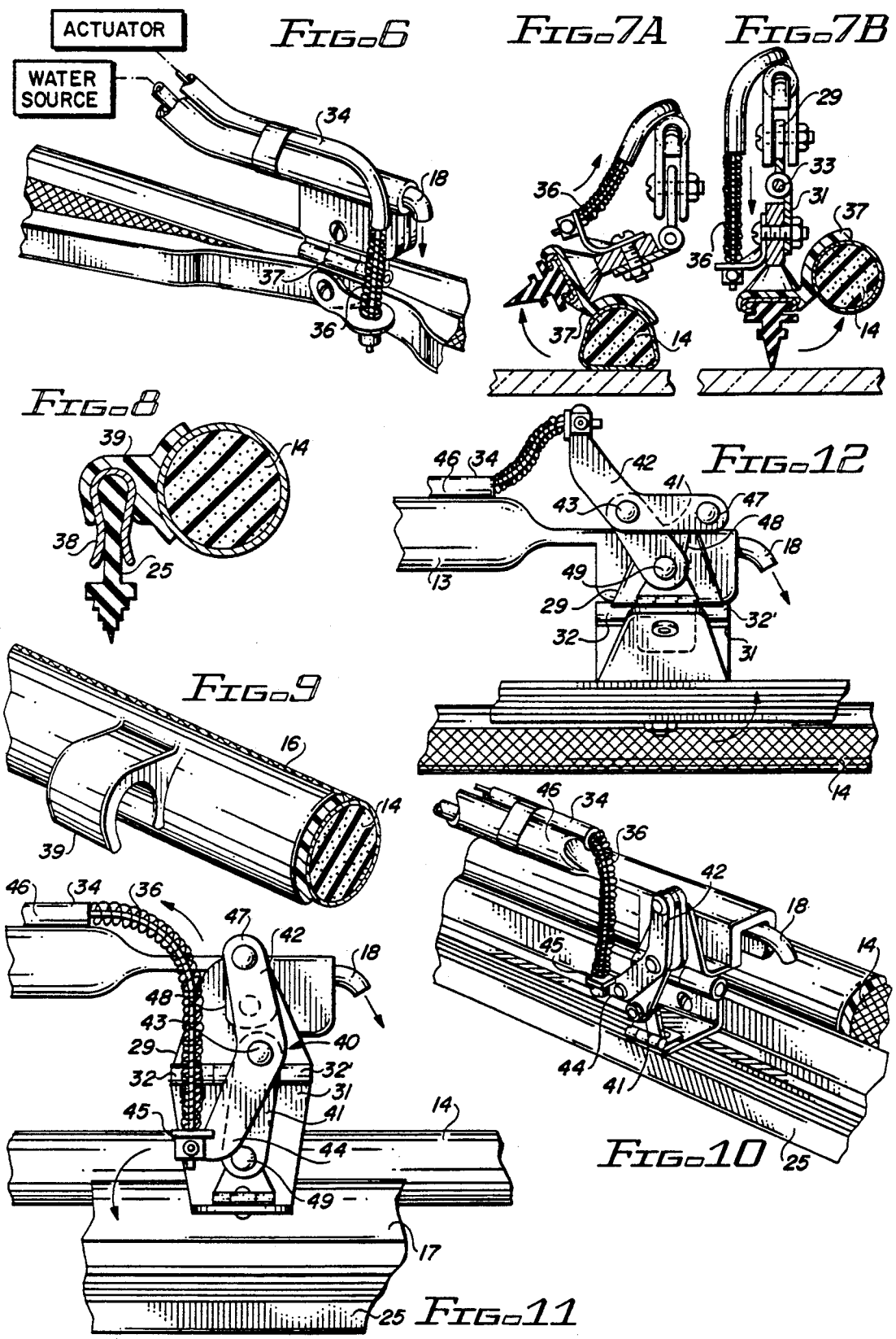

WINDSHIELD SCRUBBER AND BLADE WIPING ASSEMBLY

BACKGROUND OF THE INVENTION

This invention relates to windshield wiper systems and more particularly to a windshield wiping system employing a dual purpose scrubber and blade wiping assembly.

DESCRIPTION OF THE PRIOR ART

Dual purpose scrubber and wiper assemblies have been known wherein a sponge strip is mounted on a wiper blade with the edge of the sponge strip flush with the edge of the wiper blade.

U.S. Pat. No. 4,719,661 discloses a windshield wiper assembly which in addition to carrying a wiper blade also carries an additional cleaning device. A tappet controlled by an electromagnet causes the extension of an additional cleaning device past the normal wiper blade.

International Publications No. WO 80/0155 discloses a windshield wiper assembly having a jacking means which can urge a brush against the windshield while causing the wiper blade to be lifted out of contact with the windshield. The jacking device may be operated hydraulically, pneumatically or by a solenoid.

Other patents of interest are listed below:
U.S. Pat. No. 2,187,876
U.S. Pat. No. 4,6495593
Germany 26 19 633

Although U.S. Pat. No. 2,187,876 discloses a windshield wiper for removing ice, sleet and other substances, and U.S. Pat. No. 4,649,593 discloses wiper and cleaner assembly employing a squeegee function, and German Patent No. 26 19 633 discloses a wiper blade and brush either or both in contact with a windscreen, none of these patents disclose the claimed dual purpose scrubber and wiper assembly.

SUMMARY OF THE INVENTION

In accordance with the invention claimed, a new and improved dual purpose scrubber and wiper assembly is provided for vehicle windows wherein the scrubbing and wiping functions may be selectively controlled and the hardware locked in position during use.

It is, therefore, one object of this invention to provide a device for vehicular windshields which combines the cleaning and scrubbing apparatus in an improved manner.

Another object of this invention is to provide a dual purpose vehicle window cleaning and wiping device which may be conveniently installed and operated on a standard wiper arm assembly.

A further object of this invention is to provide an improved windshield cleaning and wiping mechanism wherein the scrubber is an elongated hollow or solid tubular member covered with a mesh or net which is mounted on the standard wiper arm assembly.

A still further object of this invention is to provide a dual purpose scrubber and wiper mechanism that sequentially provides a scrubbing and wiping function.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

FIG. 1 is a perspective view of a windshield wiper assembly for vehicles employing a cleaning device clamped on the wiper blade;

FIG. 2 is a exploded view of the circled area marked 2 in FIG. 1;

FIG. 3 is a cross sectional view of FIG. 1 taken along the line 3—3;

FIG. 4 is a cross sectional view of FIG. 1 taken along the line 4—4;

FIG. 5 is a view similar to FIG. 4 with the cleaning device in contact with a windshield;

FIG. 6 is a partial perspective view of a dual purpose wiping and cleaning device illustrating the cleaning device being clamped on to the wiper blade;

FIG. 7A is a cross sectional view of FIG. 6 showing the cleaning device in contact with the windshield;

FIG. 7B is a view similar to FIG. 7A with the wiper blade in contact with the windshield;

FIG. 8 is a cross sectional view of a modification of the attachment of the cleaning device to a wiper blade;

FIG. 9 is a perspective view of the cleaning device shown in FIG. 8 with the wiper blade removed; and FIGS. 10, 11 and 12 illustrate an over center locking means in various positions.

DESCRIPTION OF THE PREFERRED EMBODIMENT

Referring more particularly to the drawings by characters of reference, FIGS. 1-5 disclose a cleaning device 10 for a windshield 11 of a motor vehicle comprising a wiper arm 12 having, a blade assembly 13 attached thereto, in addition to a cylindrical member 14 formed of a porous plastic material which yieldingly deforms to a flat surface 15 in contact with the windshield for, a scrubbing function. A mesh or net 16 of impermeable material covers the surface of member 14. The reticular surface provided by the net on the flattened surface 15 of cylindrical member 14 greatly enhances the scrubbing action necessary to scrape solids such as insect remains from the glass without scratching. The net may be secured to the surface of cylindrical member 14 by a variety of means such as stapling, heat sealing, adhesives and the like and is impermeable to moisture.

The wiper arm 12, blade assembly 13 and scrubbing cylindrical member 14 are mounted substantially parallel to each other and spaced sufficiently apart to permit each member to flex and bend under the motion of crossing the windshield without interfering with each other.

Wiper arm 12 is pivotally connected at one end to blade assembly 13 and at the other end to a collar 17 which collar is mounted around a motor shaft (not shown) for driving the wiper arm in a repeatable variable sequence across the surface of a windshield in a pendulum like manner.

The wiper arm comprises a hollow configurations which provides a passageway for receiving a hose or conduit 18 for conducting water under pressure from a source in the associated vehicle through wiper arm 12 to its end 19 for dispersal on the windshield of a vehicle. The hollow configuration of arm 12 also provides a passageway, for an actuator means 20 for moving blade assembly 13 and cylindrical member 14 relative to windshield 11.

As noted from FIGS. 1-5, the blade assembly 13 comprises an articulated arm 21 that is fixedly attached to wiper arm 12 at its center with resilient shoes 22, 23 being flexibly mounted at each end thereof. These shoes are provided with a clamp 24 at each end thereof which forms a channel for receiving therethrough the dome shaped configuration of a resilient, plastic or rubber wiper blade 25. The geometrical configuration of the wiper blade and its mounting on the blade assembly 13 is well known in the art.

In accordance with the teaching of this invention, cylindrical member 14 is detachably fastened to wiper blade 25 by a clamping means 26. This clamping means comprises a backing strip 27, that is secured to the outer circumference of cylindrical member 14 longitudinally thereof with one or more spacedly arranged clamps 26 extending outwardly therefrom and at least partially around wiper blade 25. Thus, cylindrical member 14 is mounted on wiper blades 25 of blade assembly 13 and is movable therewith.

In the normal functioning of blade assembly 13, wiper blade 25 is in contact with the windshield and is moved across it by controls in the vehicle. In order for the operator of the vehicle to provide a scrubbing function, it is necessary to rotate the blade assembly at least partially around the end 19 of wiper arm 12. This is accomplished by securing a U-shaped clamp 28 to end 19 of the wiper arm and between the legs of which is clamped a plate 29 which extends outwardly therefrom to form a bearing 30. A plate 31 providing spaced bearings 32, 32' axially aligned with bearing 30 forms with pin 33 extending through the bearings a hinge connection when it is fixedly connected to blade assembly 13.

To move plate 31 relative to plate 29 of the hinge connection, plate 31 is connected through a cable 34 to actuator 20 such as a pneumatic or hydraulic actuating means located on the vehicle with controls 35 in the vehicle within reach of the driver. This actuator may comprise the known Bowden cable 34 which is connected at one end to a pneumatic cylinder or actuator 20 and at the other end to plate 31. Thus, when a control switch 35 is actuated, the pneumatic cylinder or actuator 20 moves cable 34 axially thereof which causes plate 31 to rotate about pin 33. This action rotates blade assembly 13 about pin 33 against the base of coil spring 36 resulting in wiper blade 25 being rotated away, from, windshield 11 and causing the scrubber blade or cylindrical member 14 to contact the surface of the windshield as shown in FIG. 5. When pressure is removed from cable 34 by controls 35, spring 36 will bias wiper blade 17 back into contact with windshield 11.

Thus, the movement of cylindrical member 14 is determined by the rotation of wiper blade 25 and it is selectively removable from the wiper blade by merely removing clamp 26 forming a part thereof from around the top arcuate surface of the wiper blade.

FIGS. 6, 7A and, 7B illustrate a modification of the means for clamping the cylindrical member 14 to the wiper blade assembly. As shown in FIGS. 7A and 7B a clamp 37 forming the backing for cylindrical member 14 is inserted over and partially around the crown of the wiper blade in a detachable manner. All other parts common with those shown in FIGS. 1-5 are given the same reference characters.

FIGS. 8 and 9 illustrate a modification of the clamping means for affixing cylindrical member 14 to the wiper blade 25. This clamping means 38 comprises a U-shaped hair pin configuration that is insertable in a cavity in the backing strip 39 of cylindrical member 14. Thus, member 14 may be readily clamped on and removed from wiper blade 25 for replacement purposes.

FIGS. 10-12 illustrate one example of an over center toggle mechanism 40 used for locking the wiper blade and scrubber in their windshield engaging positions. As shown, the toggle mechanism comprises a pair of toggle links 41 and 42 which are pivotally connected at one end of link 41 to the center of link 42 by a pin 43.

The end 44 of link 42 is connected to cable 34 under pressure of spring 36 bearing against a shoulder 45 of link 42 and the covering 46 on cable 34. The other end 47 of link 42 is connected to plate 29 through an interconnecting collar or link 48. The other end 49 of link 41 is connected to plate 31.

Thus, in the normal inactive position of cleaning device 10 the wiper blade 25 is in contact with the windshield and the over center toggle 40 is in a first locking position as shown in FIG. 11. When the cable 34 is under tension and withdrawn as shown in FIG. 11 end 44 of link 42 of the overcenter toggle mechanism is rotated clockwise about pin 43 eventually resulting in the toggle mechanism assuming the position shown in FIG. 12. In this position the toggle mechanism is again in an over center position locking the scrubber or cylindrical member 14 in position against the windshield.

This locking toggle mechanism is intended to firm up the mechanism not only during use of both the wiper blade and the scrubbing mechanism but also during the inactive state of the mechanism.

Accordingly, the disclosed dual purpose vehicle window cleaning device is intended to disclose and claim a customary wiper blade having a clamp on scrubber, either one of which may be easily replaced. Further, the disclosed structure provides a mechanism, one of which may be an over center toggle, for locking the wiper blade and/or the scrubber, in position against the windshield during a scrubbing and wiping operation.

Although but a few embodiments of the invention have been shown and described, it will be apparent to those skilled in the art that various changes and modifications may be made therein without departing from the spirit of the invention or from the scope of the appended claims.

What is claimed is:

1. A vehicular window cleaning apparatus comprising:

a windshield wiper assembly including a wiper arm, pivotal mounting means pivotally mounting a wiper blade to said wiper arm and drive means for driving said wiper arm and wiper blade across a windshield, a scrubber for intensifying the cleaning effort of said wiper blade, a coupling for detachably clamping said scrubber to said wiper blade for movement therewith, an adjustment means for rotating said wiper blade relative to said wiper arm to selectively and sequentially position said wiper blade and scrubber against said windshield, and a locking means comprising an over center toggle for interconnecting said wiper arm with said wiper blade for locking one of said wiper blade and scrubber of said window cleaning apparatus in contact with the associated windshield, said toggle comprises a pair of toggle links one pivotally connected at one of its ends to the center of the other link, with its other end connected to said wiper blade, one of the ends of said other of said links being connected to said adjustment means and its other end being connected to said wiper arm, such that when said wiper blade is in contact with a windshield said over center toggle is in a first locked position and when said over center toggle is actuated to a second position by said adjustment means said scrubber is in a second locked position in contact with said windshield.

2. The vehicular window cleaning apparatus set forth in claim 1 wherein:

said scrubber and said wiper blade each comprises an elongated member with said scrubber having an elongated backing strip secured thereto, and said coupling comprises a clamp for clamping on said wiper blade.

3. The vehicular window cleaning apparatus set forth in claim 1 wherein:

said scrubber comprises an elongated cylindrical member formed of a porous plastic material having a net of impermeable material secured to its outer periphery.

4. The vehicular window cleaning apparatus set forth in claim 1 wherein:

said pivotal mounting means comprises a pair of hingedly connected plates with one plate being connected to said wiper arm and the other plate being connected to said wiper blade.

* * * * *